(12) United States Patent
Su et al.

(10) Patent No.: US 10,847,839 B2
(45) Date of Patent: Nov. 24, 2020

(54) NON-AQUEOUS ELECTROLYTES FOR LITHIUM BATTERIES

(71) Applicant: UChicago Argonne, LLC, Chicago, IL (US)

(72) Inventors: Chi Cheung Su, Westmont, IL (US); Khalil Amine, Oakbrook, IL (US); Meinan He, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 192 days.

(21) Appl. No.: 16/052,425

(22) Filed: Aug. 1, 2018

(65) Prior Publication Data

US 2020/0044285 A1    Feb. 6, 2020

(51) Int. Cl.
| | |
|---|---|
| *H01M 10/0567* | (2010.01) |
| *H01M 10/0525* | (2010.01) |
| *H01M 10/0568* | (2010.01) |
| *H01M 4/38* | (2006.01) |
| *H01M 10/0569* | (2010.01) |

(52) U.S. Cl.
CPC ....... *H01M 10/0567* (2013.01); *H01M 4/382* (2013.01); *H01M 10/0525* (2013.01); *H01M 10/0568* (2013.01); *H01M 10/0569* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | | |
|---|---|---|---|
| 9,373,867 B2 | 6/2016 | Kawasaki et al. | |
| 9,472,830 B2 | 10/2016 | Ahn et al. | |
| 9,484,598 B2 | 11/2016 | Jeon et al. | |
| 9,515,348 B2 | 12/2016 | Tokuda et al. | |

(Continued)

FOREIGN PATENT DOCUMENTS

| | | |
|---|---|---|
| WO | WO-2015/051141 A1 | 4/2015 |
| WO | WO-2017/209762 A1 | 12/2017 |

OTHER PUBLICATIONS

Su et al., "Fluorinated Alkyl Substituted Sulfones As Electrolytes for High Voltage Lithium-Ion Battery," 227th ECS Meeting, May 2015 (Abstract Only). Accessed at http://ma.ecsdl.org/content/MA201501/2/416.abstract.

(Continued)

*Primary Examiner* — Daniel S Gatewood
(74) *Attorney, Agent, or Firm* — Foley & Lardner LLP

(57) ABSTRACT

An electrochemical cell includes a cathode active material, lithium metal, a separator, and an electrolyte comprising a lithium salt, an organic aprotic solvent and a fluorinated sulfone represented by Formula II:

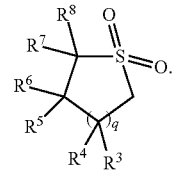

Formula II

17 Claims, 7 Drawing Sheets

(56) References Cited

U.S. PATENT DOCUMENTS

| | | | | |
|---|---|---|---|---|
| 2002/0042003 A1* | 4/2002 | Appel | ............... | H01M 6/168 |
| | | | | 429/339 |
| 2010/0167121 A1* | 7/2010 | Arai | ................ | C01B 35/12 |
| | | | | 429/188 |
| 2017/0084951 A1* | 3/2017 | Dubois | ............ | H01M 10/0525 |

OTHER PUBLICATIONS

Su et al., "Oxidatively stable fluorinated sulfone electrolytes for high voltage high energy lithium-ion batteries," Energy Environ. Sci. 2017, 10, 900-904.

\* cited by examiner

NON-AQUEOUS ELECTROLYTES FOR LITHIUM BATTERIES

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to lithium rechargeable batteries. More particularly the technology relates to the use of fluorinated sulfone compounds in lithium rechargeable batteries.

BACKGROUND

Lithium-ion batteries are used extensively as electrical power for portable electronics and hybrid electric vehicles. To facilitate the application of pure electric vehicles, lithium-ion batteries having high energy density are essential to the effort. To increase the energy density of the batteries, new anode and cathode materials are actively pursued. However, the battery performance fades rapidly at increasing potential due to the parasitic reaction of the state-of-the-art electrolytes on the cathode surface, causing transition metal ion dissolution into the electrolyte solution.

Because of its ultra-high capacity (3860 mAhg$^{-1}$), low atomic weight (6.94 gmol$^{-1}$) and negative electrochemical potential (−3.04V vs. the standard hydrogen electrode), lithium metal is an ideal anode material for rechargeable batteries. However, its extensive application has been hindered by severe safety issues associated with lithium dendrite formation and unsatisfactory Coulombic efficiency during battery cycling. It is believed that electrolyte selection is critical in stabilizing the lithium plating/stripping process. Conventional lithium-ion battery electrolytes cannot effectively suppress the lithium dendrite formation. Moreover, the oxidation instability of regular carbonate solvent impeded its application in high voltage battery.

It is therefore of great interest to the battery industry to identify electrolyte systems that enable stable lithium metal anode cycling, possess excellent solid-electrolyte interphase (SEI) forming ability, and that have high oxidation stability.

SUMMARY

In one aspect, an electrochemical cell is provided, the cell including a cathode including a cathode active material; an anode including lithium metal; a separator; and an electrolyte including a lithium salt, an organic aprotic solvent and a fluorinated sulfone represented by Formula II:

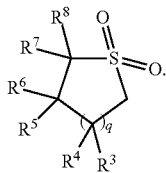

Formula II

In the compound of Formula II, $R^3$ and $R^4$ may be individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —C(O)$R^{10}$, —C(O)O$R^{10}$, or —OC(O)$R^{10}$; $R^5$, $R^6$, $R^7$, and $R^8$ may be individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —C(O)$R^{10}$, —C(O)O$R^{10}$, or —OC(O)$R^{10}$; $R^9$ may be H, alkyl, alkenyl, alkynyl, aryl, aralkyl, or heterocyclyl; $R^{10}$ may be H, alkyl, alkenyl, alkynyl, aryl, aralkyl, or heterocyclyl; and q may be 1 or 2; wherein: at least one of $R^3$, $R^4$, $R^5$, $R^6$, $R^7$, and $R^8$ may be F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

In some embodiments, $R^3$ and $R^4$ may be individually H, F, Cl, Br, I, $OR^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$; $R^5$, $R^6$, $R^7$, and $R^8$ may be individually H, F, Cl, Br, I, $OR^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$; $R^9$ may be H, fluorinated or non-fluorinated alkyl, fluorinated or non-fluorinated alkenyl, fluorinated or non-fluroinated alkynyl, fluorinated or non-fluorinated aryl, fluorinated or non-fluorinated aralkyl, or fluorinated or non-fluroinated heterocyclyl; and $R^{10}$ may be H, fluorinated or non-fluorinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluorinated heterocyclyl.

In any of the above embodiments, $R^3$ and $R^4$ may be individually H, F, OH, $OCH_3$, $OCFH_2$, $OCF_2H$, $OCF_3$, $OCHCH_2$, $OCFCH_2$, $OCHCFH$, $OCHCF_2$, $OCFCF_2$, $OCH_2CHCH$, $OCFHCHCH$, $OCH_2CFCH$, $OCH_2CHCF$, $OCH_2CFCF$, $OCF_2CFCF$, $CH_2Ph$, $CF_2Ph$, $CF_2$(fluroinated phenyl), $CH_2$(fluorinated phenyl), $C_nH_xF_y$, $CH_2C_nH_xF_y$, $CH_2OC_nH_xF_y$, or $CF_2OC_nH_xF_y$; $R^5$, $R^6$, $R^7$, and $R^8$ may be individually H, F, OH, $OCH_3$, $OCFH_2$, $OCF_2H$, $OCF_3$, $OCHCH_2$, $OCFCH_2$, $OCHCFH$, $OCHCF_2$, $OCFCF_2$, $OCH_2CHCH$, $OCFHCHCH$, $OCH_2CFCH$, $OCH_2CHCF$, $OCH_2CFCF$, $OCF_2CFCF$, $CH_2Ph$, $CF_2Ph$, $CF_2$(fluroinated phenyl), $CH_2$(fluorinated phenyl), $C_nH_xF_y$, $CH_2C_nH_xF_y$, $CH_2OC_nH_xF_y$, or $CF_2OC_nH_xF_y$; n may be 1, 2, 3, 4, 5, 6, 7, 8, 9, 10, 11, or 12; x may be 0, 1, 2, or 3; and y may be 0, 1, 2, or 3.

In any of the above embodiments, $R^3$ and $R^4$ may be individually H, F, OH, $OCH_3$, $OCF_3$, $C_nH_xF_y$, $CH_2C_nH_xF_y$, $CH_2OC_nH_xF_y$, or $CF_2OC_nH_xF_y$; $R^5$, $R^6$, $R^7$, and $R^8$ may be individually H, F, OH, $OCH_3$, $OCF_3$, $C_nH_xF_y$, $CH_2C_nH_xF_y$, $CH_2OC_nH_xF_y$, or $CF_2OC_nH_xF_y$; n may be 1, 2, 3, 4, 5, 6, 7, 8, 9, 10, 11, or 12; x may be 0, 1, 2, or 3; and y may be 0, 1, 2, or 3.

In any of the above embodiments, at least one of $R^3$ and $R^4$ and at least one of $R^5$, $R^6$, $R^7$, and $R^8$ may be F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$. In any of the above embodiments, the electrolyte may further include a compound of Formula I:

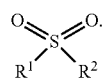

Formula I

In Formula I, $R^1$ and $R^2$ may be individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —C(O)$R^{10}$, —C(O)O$R^{10}$, or —OC(O)$R^{10}$; and at least one of $R^1$ and $R^2$ may be F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

In any of the above embodiments, $R^1$ and $R^2$ may be individually H, F, Cl, Br, I, $OR^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$; $R^9$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl; $R^{10}$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl. In some embodiments, any of the $R^{\#}$ groups may be individually $CF_3$ or $CH_2CH_3$.

In any of the above embodiments, $R^1$ and $R^2$ may be individually H, F, OH, $OCH_3$, $OCFH_2$, $OCF_2H$, $OCF_3$, $OCHCH_2$, $OCFCH_2$, $OCHCFH$, $OCHCF_2$, $OCFCF_2$, $OCH_2CHCH$, $OCFHCHCH$, $OCH_2CFCH$, $OCH_2CHCF$, $OCH_2CFCF$, $OCF_2CFCF$, $CH_2Ph$, $CF_2Ph$, $CF_2$(fluroinated phenyl), $CH_2$(fluorinated phenyl), $C_nH_xF_y$, $CH_2C_nH_xF_y$, $CH_2OC_nH_xF_y$, or $CF_2OC_nH_xF_y$; n may be 1, 2, 3, 4, 5, 6, 7, 8, 9, 10, 11, or 12; x may be 0, 1, 2, or 3; and y may be 0, 1, 2, or 3.

In any of the above embodiments, $R^1$ and $R^2$ may be individually H, F, OH, $OCH_3$, $OCF_3$, $C_nH_xF_y$, $CH_2C_nH_xF_y$, $CH_2OC_nH_xF_y$, or $CF_2OC_nH_xF_y$; n may be 1, 2, 3, 4, 5, 6, 7, 8, 9, 10, 11, or 12; x may be 0, 1, 2, or 3; and y may be 0, 1, 2, or 3. Illustrative lithium salts include, but are not limited to lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2''-tris(trifluoromethyl)benzotris(imidazolate); LiN(CN)$_2$; Li(CF$_3$CO$_2$); Li(C$_2$F$_5$CO$_2$); LiCF$_3$SO$_3$; LiCH$_3$SO$_3$; LiN(SO$_2$CF$_3$)$_2$; LiN(SO$_2$F)$_2$; LiC(CF$_3$SO$_2$)$_3$; LiN(SO$_2$C$_2$F$_5$)$_2$; LiClO$_4$; LiBF$_4$; LiAsF$_6$; LiPF$_6$; LiBF$_2$(C$_2$O$_4$), LiB(C$_2$O$_4$)$_2$, LiPF$_2$(C$_2$O$_4$)$_2$, LiPF$_4$(C$_2$O$_4$), LiAsF$_6$, CsF, CsPF$_6$, LiN(SO$_2$CF$_3$)$_2$, LiN(SO$_2$F)$_2$, Li$_2$(B$_{12}$X$_{12-p}$H$_p$); Li$_2$(B$_{10}$X$_{10-p'}$H$_{p'}$); or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10.

In any of the above embodiments, the organic aprotic solvent may be a linear carbonate, cyclic carbonate, ester, cyclic ester, or sulfone. For example, the organic aprotic solvent may be a compound represented by Formula III, IV, V, VI, VII, VIII, IX, X, XI, XII, XIV, or a mixture of any two or more thereof:

| Formula | |
|---|---|
| $R^{11}OC(O)OR^{12}$ | III |
| (structure with O-C(=O)-O ring, $R^{11}$, $R^{12}$) | IV |
| $R^{11}OC(O)R^{12}$ | V |
| (γ-butyrolactone-type ring with $R^{11}$, $R^{12}$, $R^{13}$) | VI |
| (δ-valerolactone-type ring with $R^{11}$, $R^{12}$, $R^{13}$, $R^{14}$) | VII |
| $R^{11}$—S(O)$_2$—$R^{12}$ | VIII |
| $R^{11}$—CN | IX |
| NC(CH$_2$)$_m$CN | X |
| $R^{11}$—O—$R^{12}$ | XI |
| $R^{11}$—(OCH$_2$CH$_2$)$_m$OR$^{12}$ | XII |
| $R^{11}$C(O)NR$^{12}$R$^{13}$ | XIII |
| $R^{11}$OC(O)NR$^{12}$R$^{13}$ | XIV | where, $R^{11}$, $R^{12}$, $R^{13}$, and $R^{14}$ may be individually H, F, Cl, Br, I, CN, oxo, $OR^9$, alkyl, alkenyl, alkynyl, silyl, siloxy, —C(O)$R^{10}$, —C(O)O$R^{10}$, or —OC(O)$R^{10}$; and m may be 1, 2, 3, 4, 5, or 6.

In any of the above embodiments, at least one of $R^{11}$, $R^{12}$, $R^{13}$, and $R^{14}$ may be F or a fluorinated group. For example, —CF$_3$ or —CH$_2$CF$_3$. As a further illustration, at least one of $R^{11}$, $R^{12}$, $R^{13}$, and $R^{14}$ may be F, $C_nH_xF$, $CH_2C_nH_xF_y$, $CH_2OC_nH_xF_y$, or $CF_2OC_nH_xF_y$; n may be 1, 2, 3, 4, 5, 6, 7, 8, 9, 10, 11, or 12; x may be 0, 1, 2, or 3; and y may be 0, 1, 2, or 3.

In any of the above embodiments, the organic aprotic solvent in the electrolyte may be a pyrrolidinium-based ionic liquid, a piperidinium-based ionic liquid, a imidazolium-based ionic liquid, a ammonium-based ionic liquid, phosphonium-based ionic liquid, or a cyclic phosphonium-based ionic liquid.

In any of the above embodiments, the electrolyte may also include an aprotic gel polymer carrier/solvent, an electrode stabilizing additive, or a redox shuttle molecules for overcharge protection.

In any of the above embodiments, the cell may be a lithium secondary battery. As an illustration, the secondary battery may be a lithium battery, a lithium-ion battery, a lithium-sulfur battery, or a lithium-air battery.

In any of the above embodiments, the cathode may include a spinel, an olivine, a carbon-coated olivine LiFePO$_4$, LiMn$_{0.5}$Ni$_{0.5}$O$_2$, LiCoO$_2$, LiNiO$_2$, LiNi$_{1+x}$Co$_y$Me$_z$O$_2$, LiNi$_\alpha$Mn$_\beta$Co$_\gamma$O$_2$, LiMn$_2$O$_4$, LiFeO$_2$, LiNi$_{0.5}$Me$_{1.5}$O$_4$, Li$_{1+x'}$Ni$_h$Mn$_k$Co$_l$Me$^2_{y'}$O$_{2-z'}$F$_{z'}$, VO$_2$ or E$_{x''}$F$_2$(Me$_3$O$_4$)$_3$, LiN$i_m$Mn$_n$O$_4$, wherein Me may be Al, Mg, Ti, B, Ga, Si, Mn, or Co; Me$^2$ may be Mg, Zn, Al, Ga, B, Zr, or Ti; E may be Li, Ag, Cu, Na, Mn, Fe, Co, Ni, or Zn; F may be Ti, V, Cr, Fe, or Zr; wherein 0≤x≤0.3; 0≤y≤0.5; 0≤z≤0.5; 0≤m≤2; 0≤n≤2; 0≤x'≤0.4; 0≤α≤1; 0≤β≤1; 0≤γ≤1; 0≤h≤1; 0≤k≤1; 0≤l≤1; 0≤y'≤0.4; 0≤z'≤0.4; and 0≤x''≤3; with the proviso that at least one of h, k and l may be greater than 0. In some embodiments, the cathode includes a layered structure, a spinel, a olivine with and without coating material including, but not limited to carbon, polymer, fluorine, metal oxides, NaFePO$_4$, NaCoO$_2$, NaNiO$_2$, NaMn$_2$O$_4$, or Na$_{1-x}$Ni$_\alpha$Co$_\beta$Mn$_\gamma$M$_\delta$O$_{2-z}$N'$_z$, wherein M may be Li, Al, Mg, Ti, B, Ga, Si, Zr, Zn, Cu, Fe; N' may be F, Cl, S; wherein 0≤x≤1, 1, 0≤α≤1, 0≤β≤1, 0≤γ≤1, 0≤δ≤1, 0≤z≤2; with the proviso that at least one of α,β, and γ may be greater than 0.

In any of the above embodiments, the anode may also include natural graphite, synthetic graphite, hard carbon, amorphous carbon, soft carbon, mesocarbon microbeads (MCMB), acetylene black, Ketjen black, carbon black, mesoporous carbon, porous carbon matrix, carbon nanotube, carbon nanofiber, graphene, silicon microparticle, silicon nanoparticle, silicon-carbon composite, tin microparticle, tin nanoparticle, tin-carbon composite, silicon-tin composite, phosphorous-carbon composites, black phosphorus, red phosphorus, mixture of red and black phosphorus, lithium titanium oxide, lithium metal, sodium metal, lithium titanium oxide, magnesium metal, or a mixture of any two or more thereof. In any of the above embodiments, the anode may also include synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, graphene, black phosphorus, red phosphorus, mixture of red and black phosphorus, Ge, SnSb, NiCo$_2$O$_4$, Sb$_2$O$_4$, or Co$_3$O$_4$.

In any of the above embodiments, the fluorinated sulfone may be 4-(trifluoromethyl)-1,3,2-dioxathiolane-2,2-dioxide (TFDTD).

In any of the above embodiments, the polar aprotic solvent may include one or more of ethylmethylsulfone (EMS), ethyl(trifluoromethyl)sulfone (FMES), ethylene carbonate (EC), ethylmethyl carbonate (EMC), fluoroethylene carbonate (FEC), difluoroethylene carbonate (DFEC).

DETAILED DESCRIPTION

Figure 1:
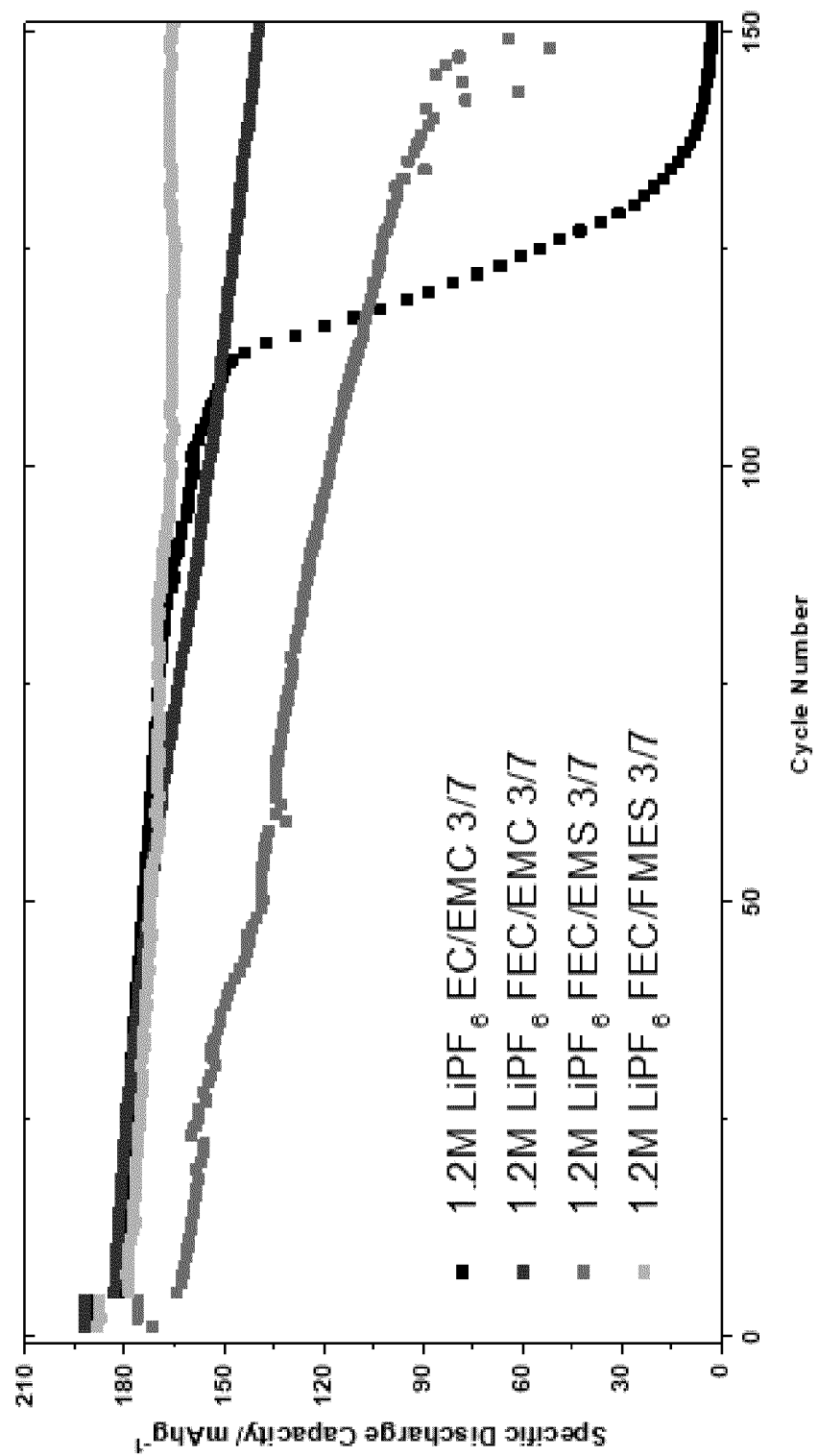
FIG. 1 is a discharge capacity vs. cycle number graph for LiNi$_{0.6}$Mn$_{0.2}$Co$_{0.2}$O$_2$/lithium metal half-cell in the 2032 coin cells using 1.2M LiPF$_6$ in EC/EMC 3/7 (Gen 2) electrolyte, 1.2M LiPF$_6$ in FEC/EMC 3/7 electrolyte, 1.2M LiPF$_6$ in FEC/EMS 3/7 electrolyte and 1.2M LiPF$_6$ in FEC/FMES 3/7 electrolyte. The cells were cycled from 3.0 V to 4.4 V at the rate of C/2, according to Example 1.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Provided herein are lithium ion battery electrolytes that improve upon cycling stability, coulombic efficiency, and SEI formation, compared to more traditional and even state of the art electrolytes. The electrolytes are based upon fluorinated linear and cyclic sulfones and dioxathiolanes.

In one aspect, an electrolyte is provided that includes a salt and a fluorinated sulfone compound represented by Formula II:

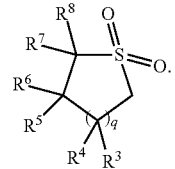

Formula II

In Formula II, $R^3$ and $R^4$ may be individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —C(O)$R^{10}$, —C(O)O$R^{10}$, or —OC(O)$R^{10}$; $R^5$, $R^6$, $R^7$, and $R^8$ may be individually H, F, Cl, Br, I, $OR^9$, alkyl, alkenyl, alkynyl, silyl, siloxy, —C(O)$R^{10}$, —C(O)O$R^{10}$, or —OC(O)$R^{10}$; $R^9$ may be H, alkyl, alkenyl, alkynyl, aryl, aralkyl, or heterocyclyl; $R^{10}$ may be H, alkyl, alkenyl, alkynyl, aryl, aralkyl, or heterocyclyl; and q may be 1 or 2. In Formula II at least one of $R^3$, $R^4$, $R^5$, $R^6$, $R^7$, and $R^8$ is F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$. In some embodiments, at least one of $R^3$ and $R^4$, and at least one of $R^5$, $R^6$, $R^7$, and $R^8$ is F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

In some embodiments of Formula II, $R^3$ and $R^4$ may be individually H, F, Cl, Br, I, $OR^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$; $R^5$, $R^6$, $R^7$, and $R^8$ may be individually H, F, Cl, Br, I, $OR^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$; $R^9$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl; $R^{10}$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl.

In some embodiments of Formula II, $R^3$ and $R^4$ may be individually H, F, OH, OCH$_3$, OCFH$_2$, OCF$_2$H, OCF$_3$, OCHCH$_2$, OCFCH$_2$, OCHCFH, OCHCF$_2$, OCFCF$_2$, OCH$_2$CHCH, OCFHCHCH, OCH$_2$CFCH, OCH$_2$CHCF, OCH$_2$CFCF, OCF$_2$CFCF, CH$_2$Ph, CF$_2$Ph, CF$_2$(fluroinated phenyl), CH$_2$(fluroinated phenyl), C$_n$H$_x$F$_y$, CH$_2$C$_n$H$_x$F$_y$, CH$_2$OC$_n$H$_x$F$_y$, or CF$_2$OC$_n$H$_x$F$_y$; $R^5$, $R^6$, $R^7$, and $R^8$ may be individually H, F, OH, OCH$_3$, OCFH$_2$, OCF$_2$H, OCF$_3$, OCHCH$_2$, OCFCH$_2$, OCHCFH, OCHCF$_2$, OCFCF$_2$, OCH$_2$CHCH, OCFHCHCH, OCH$_2$CFCH, OCH$_2$CHCF, OCH$_2$CFCF, OCF$_2$CFCF, CH$_2$Ph, CF$_2$Ph, CF$_2$(fluroinated phenyl), CH$_2$(fluroinated phenyl), C$_n$H$_x$F$_y$, CH$_2$C$_n$H$_x$F$_y$, $CH_2OC_nH_xF_y$, or $CF_2OC_nH_xF_y$; n is 1, 2, 3, 4, 5, 6, 7, 8, 9, 10, 11, or 12; x is 0, 1, 2, or 3; and y is 0, 1, 2, or 3. In some embodiments, any one or more of $R^3$—$R^8$ may be individually —$CF_3$ or —$CH_2CF_3$.

In some embodiments of Formula II, $R^3$ and $R^4$ are individually H, F, OH, $OCH_3$, $OCF_3$, $C_nH_xF_y$, $CH_2C_nH_xF_y$, $CH_2OC_nH_xF_y$, or $CF_2OC_nH_xF_y$; $R^5$, $R^6$, $R^7$, and $R^8$ are individually H, F, OH, $OCH_3$, $OCF_3$, $C_nH_xF_y$, $CH_2C_nH_xF_y$, $CH_2OC_nH_xF_y$, or $CF_2OC_nH_xF_y$; n is 1, 2, 3, 4, 5, 6, 7, 8, 9, 10, 11, or 12; x is 1, 2, or 3; and y is 0, 1, 2, or 3. In some embodiments, $R^3$ and $R^4$ are individually —$CF_3$ or —$CH_2CF_3$.

The electrolyte may further include a compound represented by Formula I:

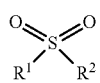

Formula I

In Formula I, $R^1$ and $R^2$ may be individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —$C(O)R^{10}$, —$C(O)OR^{10}$, or —$OC(O)R^{10}$; $R^9$ may be H, alkyl, alkenyl, alkynyl, aryl, aralkyl, or heterocyclyl; $R^{10}$ may be H, alkyl, alkenyl, alkynyl, aryl, aralkyl, or heterocyclyl; and q may be 1 or 2. In Formula I, at least one of $R^1$ and $R^2$ is F, fluorinated alkyl, fluorinated alkenyl, fluorinated alkynyl, fluorinated silyl, fluorinated siloxy, fluorinated —$C(O)R^{10}$, fluorinated —$C(O)OR^{10}$, or fluorinated —$OC(O)R^{10}$. In some embodiments, $R^1$ and $R^2$ are individually —$CF_3$ or —$CH_2CF_3$.

In some embodiments of Formula I, $R^1$ and $R^2$ may be individually H, F, Cl, Br, I, $OR^9$, fluorinated alkyl, fluorinated alkenyl, fluorinated alkynyl, fluorinated silyl, fluorinated siloxy, fluorinated —$C(O)R^{10}$, fluorinated —$C(O)OR^{10}$, or fluorinated —$OC(O)R^{10}$; $R^9$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl; and $R^{10}$ may be H, fluorinated or non-fluroinated alkyl, fluorinated or non-fluroinated alkenyl, fluorinated or non-fluroinated alkynyl, fluorinated or non-fluroinated aryl, fluorinated or non-fluroinated aralkyl, or fluorinated or non-fluroinated heterocyclyl.

In some embodiments of Formula I, $R^1$ and $R^2$ may be individually H, F, OH, $OCH_3$, $OCFH_2$, $OCF_2H$, $OCF_3$, $OCHCH_2$, $OCFCH_2$, $OCHCFH$, $OCHCF_2$, $OCFCF_2$, $OCH_2CHCH$, $OCFHCHCH$, $OCH_2CFCH$, $OCH_2CHCF$, $OCH_2CFCF$, $OCF_2CFCF$, $CH_2Ph$, $CF_2Ph$, $CF_2$(fluroinated phenyl), $CH_2$(fluorinated phenyl), $C_nH_xF_y$, $CH_2C_nH_xF_y$, $CH_2OC_nH_xF_y$, or $CF_2OC_nH_xF_y$; n is 1, 2, 3, 4, 5, 6, 7, 8, 9, 10, 11, or 12; x is 1, 2, or 3; and y is 0, 1, 2, or 3.

In some embodiments of Formula I, $R^1$ and $R^2$ are individually H, F, OH, $OCH_3$, $OCF_3$, $C_nH_xF_y$, $CH_2C_nH_xF_y$, $CH_2OC_nH_xF_y$, or $CF_2OC_nH_xF_y$; n is 1, 2, 3, 4, 5, 6, 7, 8, 9, 10, 11, or 12; x is 1, 2, or 3; and y is 0, 1, 2, or 3.

In any of the above embodiments, any of $R^1$—$R^8$ may —$CFH_2$; —$CF_2H$; —$CF_3$; —$CF_2CF_3$; —$CF_2CHF_2$; —$CF_2CH_3$; —$CF_2CH_2F$; —$CHFCF_3$; —$CHFHF_2$; —$CHFCH_3$; —$CHFCH_2F$; —$CH_2CF_3$; —$CH_2CHF_2$; —$CH_2CH_2F$; —$CF(CF_3)_2$; —$CH(CF_3)_2$; —$CF_2CF_2CF_3$; —$CF_2CF_2CHF_2$; —$CF_2CF_2CH_3$; —$CF_2CF_2CH_2F$; —$CF_2CF_3$; —$CH_2CF_2CHF_2$; —$CH_2CF_2CH_3$; —$CH_2CF_2CH_2F$; —$CHFCF_2CF_3$; —$CHFCF_2CHF_2$; —$CHFCF_2CH_3$; —$CHFCF_2CH_2F$; —$CF_2CH_2CF_3$; —$CF_2CH_2CHF_2$; —$CF_2CH_2CH_3$; —$CF_2CH_2CH_2F$; —$CF_2CHFCF_3$; —$CF_2CHFCHF_2$; —$CF_2CHFCH_3$; —$CF_2CHFCH_2F$; —$CHFCHFCF_3$; —$CHFCHFCHF_2$; —$CH_2CH_2CF_3$; —$CH_2CH_2CHF_2$; —$CH_2CH_2CH_2F$; —$CF_2CF_2CF_2CF_3$; —$CF_2CF_2CF_2CH_3$; —$CF_2CF_2CF_2CHF_2$; —$CF_2CF_2CF_2CH_2F$; —$CH_2CF_2CF_2CF_3$; —$CH_2CF_2CF_2CH_3$; —$CH_2CF_2CF_2CHF_2$; —$CH_2CF_2CF_2CH_2F$; —$CHFCF_2CF_2CF_3$; —$CHFCF_2CF_2CH_3$; —$CHFCF_2CF_2CHF_2$; —$CHFCF_2CF_2CH_2F$; —$CF_2CH_2CF_2CF_3$; —$CF_2CH_2CF_2CH_3$; —$CF_2CH_2CF_2CHF_2$; —$CF_2CH_2CF_2CH_2F$; —$CF_2CHFCF_2CF_3$; —$CF_2CHFCF_2CH_3$; —$CF_2CHFCF_2CHF_2$; —$CF_2CHFCF_2CH_2F$; —$CHFCHFCF_2CF_3$; —$CHFCHFCF_2CH_3$; —$CHFCHFCF_2CHF_2$; —$CHFCHFCF_2CH_2F$; —$CH_2CH_2CF_2CF_3$; —$CH_2CH_2CF_2CH_3$; —$CH_2CH_2CF_2CHF_2$; —$CH_2CH_2CF_2CH_2F$; —$CF_2CF_2CF_2CF_2CF_3$; —$CH_2CF_2CF_2CF_2CF_3$; —$CF_2CF_2CF_2CF_2CHF_2$; —$CH_2CF_2CF_2CF_2CHF_2$; —$CF_2OCFH_2$; —$CF_2OCF_2H$; —$CF_2OCF_3$; —$CF_2OCF_2CF_3$; —$CF_2OCF_2CHF_2$; —$CF_2OCF_2CH_3$; —$CF_2OCF_2CH_2F$; —$CF_2OCHFCF_3$; —$CF_2OCHFCHF_2$; —$CF_2OCHFCH_3$; —$CF_2OCHFCH_2F$; —$CF_2OCH_2CF_3$; —$CF_2OCH_2CHF_2$; —$CF_2OCH_2CH_2F$; —$CH_2OCFH_2$; —$CH_2OCF_2H$; —$CH_2OCF_3$; —$CH_2OCF_2CF_3$; —$CH_2OCF_2CHF_2$; —$CH_2OCF_2CH_3$; —$CH_2OCF_2CH_2F$; —$CH_2OCHFCF_3$; —$CH_2OCHFCHF_2$; —$CH_2OCHFCH_3$; —$CH_2OCHFCH_2F$; —$CH_2OCH_2CF_3$; —$CH_2OCH_2CHF_2$; —$CH_2OCH_2CH_2F$; —$CHFOCFH_2$; —$CHFOCF_2H$; —$CHFOCF_3$; —$CHFOCF_2CF_3$; —$CHFOCF_2CHF_2$; —$CHFOCF_2CH_3$; —$CHFOCF_2CH_2F$; —$CHFOCHFCF_3$; —$CHFOCHFCHF_2$; —$CHFOCHFCH_3$; —$CHFOCHFCH_2F$; —$CHFOCH_2CF_3$; —$CHFOCH_2CHF_2$; or —$CHFOCH_2CH_2F$.

In the electrolytes described herein, the salt may be an alkali metal salt such as lithium or sodium. Where the salt is a lithium salt, it may be selected from, but not limited to, lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li(CF_3CO_2)$; $Li(C_2F_5CO_2)$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, CsF, $CsPF_6$, $LiN(SO_2CF_3)_2$, $LiN(SO_2F)_2$, $Li_2(B_{12}X_{12-p}H_p)$; $Li_2(B_{10}X_{10-p'}H_{p'})$; or a mixture of any two or more thereof, wherein X is independently at each occurrence a halogen, p is 0, 1, 2, 3, 4, 5, 6, 7, 8, 9, 10, 11, or 12, and p' is 0, 1, 2, 3, 4, 5, 6, 7, 8, 9, or 10. In some embodiments, the salt may be $LiPF_6$, $LiBF_4$, $LiN(SO_2CF_3)_2$, or $LiN(SO_2F)_2$. Where the salt is a sodium salt any of the above may be used as the sodium salt instead of the lithium salt. The salt may be present in the electrolyte at any amount including from about 0.5 M to 3 M. This may include from about 1 M to about 2M.

The electrolytes may further include other additives that aid in supporting the electrolyte. Illustrative additives include, but are not limited to, $LiB(C_2O_4)_2$ (where such is not also the lithium salt), $LiBF_2(C_2O_4)_2$ (where such is not also the lithium salt), vinylene carbonate, vinyl ethylene carbonate, propargylmethyl carbonate, 1,3,2-dioxathiolane-2,2-dioxide, ethylene sulfite, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, or a mixture of two or more thereof.

The electrolytes may further include a polar aprotic solvent. Such polar aprotic solvents may include, but are not limited to, organic carbonates, fluorinated carbonates, ethers, fluorinated ethers, glymes, other sulfones, organic sulfates, esters, cyclic esters, fluorinated esters, nitriles, amides, dinitriles, fluorinated amides, carbamates, fluorinated carbamates, cyanoester compounds, pyrrolidinium-based ionic liquids, piperidinium-based ionic liquids, imidazolium-based ionic liquids, ammonium-based ionic liquids, phosphonium-based ionic liquids, or cyclic phosphonium-based ionic liquids.

The polar aprotic solvent may be a compound as represented by Formula III, IV, V, VI, VII, VIII, IX, X, XI, XII, XIV, or a mixture of any two or more thereof:

| Formula | |
|---|---|
| $R^{11}OC(O)OR^{12}$ | III |
| (cyclic carbonate with $R^{11}$, $R^{12}$) | IV |
| $R^{11}OC(O)R^{12}$ | V |
| (γ-butyrolactone-type with $R^{11}$, $R^{12}$, $R^{13}$) | VI |
| (δ-valerolactone-type with $R^{11}$, $R^{12}$, $R^{13}$, $R^{14}$) | VII |
| $R^{11}$—S(O)$_2$—$R^{12}$ | VIII |
| $R^{11}$—CN | IX |
| NC(CH$_2$)$_m$CN | X |
| $R^{11}$—O—$R^{12}$ | XI |
| $R^{11}$—(OCH$_2$CH$_2$)$_m$OR$^{12}$ | XII |
| $R^{11}$C(O)NR$^{12}$R$^{13}$ | XIII |
| $R^{11}$OC(O)NR$^{12}$R$^{13}$ | XIV |

In the above formulae, $R^{11}$, $R^{12}$, $R^{13}$, and $R^{14}$ are individually H, F, Cl, Br, I, CN, oxo, $OR^9$, alkyl, alkenyl, alkynyl, silyl, siloxy, —C(O)R$^{10}$, —C(O)OR$^{10}$, or —OC(O)R$^{10}$; and m is 1, 2, 3, 4, 5, or 6. In some embodiments, at least one of $R^{11}$, $R^{12}$, $R^{13}$, and $R^{14}$ is F or a fluorinated group. In any of these embodiments, at least one of $R^{11}$, $R^{12}$, $R^{13}$, and $R^{14}$ may be F, $C_nH_xF_y$, $CH_2C_nH_xF_y$, $CH_2OC_nH_xF_y$, or $CF_2OC_nH_xF_y$; n is 1, 2, 3, 4, 5, 6, 7, 8, 9, 10, 11, or 12; x is 1, 2, or 3; and y is 0, 1, 2, or 3.

Illustrative solvents include, but are not limited to, $N(CF_3SO_2)_2^-$, $N(FSO_2)_2^-$, $N(CF_3CF_2SO_2)_2^-$, $C(CF_3SO_2)_3^-$, $CF_3SO_3^-$, $CF_3CO_2^-$, $N(CN)_2^-$, or $C_2F_5CO_2^-$. Illustrative ionic liquids include, but are not limited to, 1-ethyl-3-methyl-imidazolium bis(trifluoromethanesulfonyl)imide, 1-ethyl-3-methyl-imidazolium bis(fluorosulfonyl)imide, 1-ethyl-2,3-dimethyl-imidazolium bis(trifluoromethanesulfonyl)imide, 1-ethyl-2,3-dimethyl-imidazolium bis(fluorosulfonyl)imide, 1-methyl-3-ethyl-imidazolium bis(trifluoromethanesulfonyl)imide, 1-methyl-3-ethyl-imidazolium bis(fluorosulfonyl)imide, 1-ethyl-3-(2-methoxyethoxymethyl)-1H-imidazol-3-ium bis(trifluoromethanesulfonyl)imide, 1-ethyl-3-(2-methoxyethoxymethyl)-1H-imidazol-3-ium bis(fluorosulfonyl)imide, 1-n-butyl-3-methyl-imidazolium bis(trifluoromethanesulfonyl)imide, 1-n-butyl-3-methyl-imidazolium bis(fluorosulfonyl)imide, 3-ethyl-1-(2-methoxyethyl)-1H-imidazol-3-ium bis(trifluoromethanesulfonyl)imide, 3-ethyl-1-(2-methoxyethyl)-1H-imidazol-3-ium bis(fluorosulfonyl)imide; pyrrolidinium salts such as 1-butyl-1-methylpyrrolidinium bis(trifluoromethanesulfonyl)imide, 1-butyl-1-methylpyrrolidinium bis(fluorosulfonyl)imide, 1-ethyl-1-methylpyrrolidinium bis(trifluoromethanesulfonyl)imide, 1-ethyl-1-methylpyrrolidinium bis(fluorosulfonyl)imide, 1-methyl-1-propylpyrrolidinium bis(trifluoromethanesulfonyl)imide, 1-methyl-1-propylpyrrolidinium bis(fluorosulfonyl)imide, 1-(2-methoxyethyl)-1-ethylpyrrolidinium bis(trifluoromethanesulfonyl)imide, 1-(2-methoxyethyl)-1-ethylpyrrolidinium bis(fluorosulfonyl)imide; piperidinium salts such as 1-butyl-1-methylpiperidinium bis(trifluoromethanesulfonyl)imide, 1-butyl-1-methylpiperidinium bis(fluorosulfonyl)imide, 1-methyl-1-propyl piperidinium bis(trifluoromethanesulfonyl)imide, 1-methyl-1-propyl piperidinium bis(fluorosulfonyl)imide, 1-(2-methoxyethyl)-1-ethylpiperidinium bis(trifluoromethanesulfonyl)imide, 1-(2-methoxyethyl)-1-ethylpiperidinium bis(fluorosulfonyl)imide; phosphonium salts such as triethyl(2-methoxyethyl)phosphonium bis(trifluoromethanesulfonyl)imide, triethyl(2-methoxyethyl)phosphonium bis(fluorosulfonyl)imide, tripropyl(2-methoxyethyl)phosphonium bis(trifluoromethanesulfonyl)imide, tripropyl(2-methoxyethyl)phosphonium bis(fluorosulfonyl)imide, tributyl(2-methoxyethyl)phosphonium bis(trifluoromethanesulfonyl)imide, tributyl(2-methoxyethyl)phosphonium bis(fluorosulfonyl)imide, tetraethylphosphonium bis(trifluoromethanesulfonyl)imide, tetraethylphosphonium bis(fluorosulfonyl)imide, tetrabutylphosphonium bis(trifluoromethanesulfonyl)imide, tetrabutylphosphonium bis(fluorosulfonyl)imide, tributylmethylphosphonium bis(trifluoromethanesulfonyl)imide, tributylmethylphosphonium bis(fluorosulfonyl)imide, triethylbutylphosphonium bis(trifluoromethanesulfonyl)imide, triethylbutylphosphonium bis(fluorosulfonyl)imide, ethylene carbonate, fluoroethylene carbonate, 4-(trifluoromethyl)-1,3-dioxolan-2-one, propylene carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, trifluoroethyl ethyl carbonate, heptafluoropropyl ethyl carbonate, hexafluoroisopropyl methyl carbonate, pentafluoroethyl ethyl carbonate, pentafluorobutyl methyl carbonate, pentafluorobutyl ethyl carbonate, dimethoxyethane, triglyme, dimethyl ether, diglyme, tetraglyme, dimethyl ethylene carbonate, ethyl acetate, trifluoroethyl acetate, ethyl methyl sulfone, sulfolane, methyl isopropyl sulfone, butyrolactone, acetonitrile, succinonitrile, methyl 2-cyanoacetate, N,N-dimethylacetamide, 2,2,2-trifluoro-N,N-dimethylacetamide, methyl dimethylcarbamate, 2,2,2-trifluoroethyl dimethylcarbamate, and mixtures of any two or more thereof. In some embodiments, the polar aprotic solvent is ethylene carbonate, fluoroethylene carbonate, 4-(trifluoromethyl)-1,3-dioxolan-2-one, propylene carbonate, dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, trifluoroethyl ethyl carbonate, heptafluoropropyl ethyl carbonate, hexafluoroisopropyl methyl carbonate, pentafluoroethyl ethyl carbonate, pentafluorobutyl methyl carbonate, pentafluorobutyl ethyl carbonate, dimethoxyethane, triglyme, dimethyl ether, diglyme, tetraglyme, dimethyl ethylene carbonate, ethyl acetate, trifluoroethyl acetate, ethyl methyl sulfone, sulfolane, methyl isopropyl sulfone, butyrolactone, acetonitrile, succinonitrile, methyl 2-cyanoacetate, N,N-dimethylacetamide, 2,2,2-trifluoro-N,N-dimethylacetamide, methyl dimethylcarbamate, 2,2,2-trifluoroethyl dimethylcarbamate, or a mixture of any two or more thereof.

In some embodiments, the electrolyte may include a redox shuttle. The shuttle, if present, will have an electrochemical potential above the cathode's maximum normal operating potential. Illustrative stabilizing agents include, but are not limited to, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, lithium alkyl fluorophosphates, lithium alkyl fluoroborates, lithium 4,5-dicyano-2-(trifluoromethyl)imidazole, lithium 4,5-dicyano-2-methylimidazole, trilithium 2,2',2''-tris(trifluoromethyl)benzotris(imidazolate), $Li(CF_3CO_2)$, $Li(C_2F_5CO_2)$, $LiCF_3SO_3$, $LiCH_3SO_3$, $LiN(SO_2CF_3)_2$, $LiC(CF_3SO_2)_3$, $LiN(SO_2C_2F_5)_2$, $LiClO_4$, $LiAsF_6$, $Li_2(B_{12}X_{12-i}H_i)$, $Li_2(B_{10}X_{10-i'}H_{i'})$, wherein X is independently at each occurrence a halogen, I is an integer from 0 to 12 and I' is an integer from 0 to 10, 1,3,2-dioxathiolane 2,2-dioxide, 4-methyl-1,3,2-dioxathiolane 2,2-dioxide, 4-(trifluoromethyl)-1,3,2-dioxathiolane 2,2-dioxide, 4-fluoro-1,3,2-dioxathiolane 2,2-dioxide, 4,5-difluoro-1,3,2-dioxathiolane 2,2-dioxide, dimethyl sulfate, methyl (2,2,2-trifluoroethyl) sulfate, methyl (trifluoromethyl) sulfate, bis(trifluoromethyl) sulfate, 1,2-oxathiolane 2,2-dioxide, methyl ethanesulfonate, 5-fluoro-1,2-oxathiolane 2,2-dioxide, 5-(trifluoromethyl)-1,2-oxathiolane 2,2-dioxide, 4-fluoro-1,2-oxathiolane 2,2-dioxide, 4-(trifluoromethyl)-1,2-oxathiolane 2,2-dioxide, 3-fluoro-1,2-oxathiolane 2,2-dioxide, 3-(trifluoromethyl)-1,2-oxathiolane 2,2-dioxide, difluoro-1,2-oxathiolane 2,2-dioxide, 5H-1,2-oxathiole 2,2-dioxide, 2,5-dimethyl-1,4-dimethoxybenzene, 2,3,5,6-tetramethyl-1,4-dimethoxybenzene, 2,5-di-tert-butyl-1,4-dimethoxybenzene or a mixture of any two or more thereof.

In another aspect, an electrochemical device is provided including an anode including lithium, a cathode having a cathode active material, a separator between the anode and cathode, and any of the electrolytes described herein. For example, the electrolyte may include any of the compounds of Formula II, or a mixture of the compounds of Formula I and II. In some embodiments, the anode is intercalated with lithium or alloyed with lithium or lithium metal.

In some embodiments, the anode may also include graphite particles, silicon, tin, lithium titanium oxide, lithium metal, or an organolithium compound. In some embodiments, the anode includes microparticles or nanoparticles that are adhered to one another with a binder. In some embodiments, the anode includes hard carbon or phosphorus-carbon composites or sodium metal or organosodium compound. In some embodiments, the particles are microparticles or nanoparticles. In some embodiments, the anode includes synthetic graphite, natural graphite, amorphous carbon, hard carbon, soft carbon, acetylene black, MCMB, carbon black, Ketjen black, mesoporous carbon, porous carbon matrix, carbon nanotube, carbon nanofiber, graphene, black phosphorus, red phosphorus, mixture of red and black phosphorus, Ge, SnSb, $NiCo_2O_4$, $Sb_2O_4$, or $Co_3O_4$.

The anode may be further stabilized by surface coating the active particles with a material. Hence the anodes can also comprise a surface coating of a metal oxide or fluoride such as $ZrO_2$, $TiO_2$, $ZnO_2$, $WO_3$, $Al_2O_3$, $MgO$, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, of any other suitable metal oxide or fluoride.

The anode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

In some embodiments, the cathode active material includes, but is not limited to a spinel, olivine, $Li_{1+w}Mn_xNi_yCo_zO_2$, $LiMn_xNi_yO_4$, or $a'Li_2MnO_3(1-a')LiMO_2$, wherein $0<w<1$, $0\le x<1$, $0\le y<1$, $0\le z<1$, and $x+y+z=1$; $0\le x'<2$, $0\le y'<2$, and $x'+y'=2$; and $0\le a'<2$. As used herein, a "spinel" refers to a manganese-based spinel such as, $Li_{1+x}Mn_{2-y}Me_zO_{4-h}A_k$, wherein Me is Al, Mg, Ti, B, Ga, Si, Ni, or Co; A is S or F; and wherein $0\le x\le 0.5$, $0\le y\le 0.5$, $0\le z\le 0.5$, $0\le h\le 0.5$, and $0\le k\le 0.5$. The term "olivine" refers to an iron-based olivine such as, $LiFe_{1-x}Me_yPO_{4-h}A_k$, wherein Me is Al, Mg, Ti, B, Ga, Si, Ni, or Co; A is S or F; and wherein $0\le x\le 0.5$, $0\le y\le 0.5$, $0\le h\le 0.5$, and $0\le k\le 0$. Other cathode active materials may include any of the following, alone or in combination with any of the cathode active materials described herein, a spinel, an olivine, a carbon-coated olivine $LiFePO_4$, $LiMn_{0.5}Ni_{0.5}O_2$, $LiCoO_2$, $LiNiO_2$, $LiNi_{1-x}Co_yMe_zO_2$, $LiNi_\alpha Mn_\beta Co_\gamma O_2$, $LiMn_2O_4$, $LiFeO_2$, $LiNi_{0.5}Me_{1.5}O_4$, $Li_{1+x}Ni_hMn_kCO_lMe^2_yO_{2-z}F_{z'}$, $VO_2$ or $E_{x''}F_2(Me_3O_4)_3$, $LiNi_mMn_nO_4$, wherein Me is Al, Mg, Ti, B, Ga, Si, Mn, or Co; $Me^2$ is Mg, Zn, Al, Ga, B, Zr, or Ti; E is Li, Ag, Cu, Na, Mn, Fe, Co, Ni, or Zn; F is Ti, V, Cr, Fe, or Zr; wherein $0\le x\le 0.3$; $0\le y\le 0.5$; $0\le z\le 0.5$; $0\le m\le 2$; $0\le n\le 2$; $0\le x'\le 0.4$; $0\le\alpha\le 1$; $0\le\beta\le 1$; $0\le\gamma\le 1$; $0\le h\le 1$; $0\le k\le 1$; $0\le l\le 1$; $0\le y'\le 0.4$; $0\le z'\le 0.4$; and $0\le x''\le 3$; with the proviso that at least one of h, k and l is greater than 0.

The cathode may be further stabilized by surface coating the active particles with a material that can neutralize acid or otherwise lessen or prevent leaching of the transition metal ions. Hence the cathodes can also comprise a surface coating of a metal oxide or fluoride such as $ZrO_2$, $TiO_2$, $ZnO_2$, $WO_3$, $Al_2O_3$, $MgO$, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, of any other suitable metal oxide or fluoride. The coating can be applied to a carbon coated cathode.

The cathode may be further stabilized by surface coating the active particles with polymer materials. Examples of polymer coating materials include, but not limited to, polysiloxanes, polyethylene glycol, or poly(3,4-ethylenedioxythiophene) polystyrene sulfonate, a mixture of any two or more polymers.

The electrodes of the lithium batteries may also include a current collector. Current collectors for either the anode or the cathode may include those of copper, stainless steel, titanium, tantalum, platinum, gold, aluminum, nickel, cobalt, cobalt nickel alloy, highly alloyed ferritic stainless steel containing molybdenum and chromium; or nickel-, chromium-, or molybdenum containing alloys.

Current collectors may also be associated with either the anode, cathode, or both the anode and the cathode. The current collector has an obverse surface and a reverse surface. Where the anodic material may be associated with either the obverse or the reverse surface, or both the designation is used to illustrate placement of the lithium/sodium additive material, where the material is lithium metal foil, sodium metal foil, lithium metal particles, or sodium metal particles. For example, where the an anode active material is in contact with the obverse surface, the lithium/sodium metal foil, particulate, or powder may be proximal to the reverse surface. Or, in other words, on the opposite face of the current collector from the anodic material. Alternatively, where the anodic material is in contact with the obverse surface, the lithium metal foil may be proximal to the anodic material. Or, in other words, sandwiched between the anodic material and a separator prior to the cathode.

The electrodes (i.e., the cathode and/or the anode) may also include a conductive polymer as a binder. Illustrative conductive polymers include, but not limited to, polyaniline, polypyrrole, poly(pyrrole-co-aniline), polyphenylene, polythiophene, polyacetylene, polysiloxane, polyvinylidene difluoride, or polyfluorene.

The lithium batteries disclosed herein also includes a porous separator to separate the cathode from the anode and prevent, or at least minimize, short-circuiting in the device. The separator may be a polymer or ceramic or mixed separator. The separator may include, but is not limited to, polypropylene (PP), polyethylene (PE), trilayer (PP/PE/PP), or polymer films that may optionally be coated with alumina-based ceramic particles.

The present invention, thus generally described, will be understood more readily by reference to the following examples, which are provided by way of illustration and are not intended to be limiting of the present invention.

EXAMPLES

Example 1

The following half cells based upon $LiNi_{0.6}Mn_{0.2}Co_{0.2}O_2$/lithium were prepared.

| Half-cell | Electrolyte | |
|---|---|---|
| | Salt | Solvent |
| 1 | 1.2M $LiPF_6$ | $EC^3/EMC^4$ (3/7) |
| 2 | 1.2M $LiPF_6$ | $FEC^5$/EMC (3/7) |
| 3 | 1.2M $LiPF_6$ | FEC/$EMS^1$ (3/7) |
| 4 | 1.2M $LiPF_6$ | FEC/$FMES^2$ (3/7) |

[1]ethylmethylsulfone (EMS).
[2]ethyl(trifluoromethyl)sulfone (FMES)
[3]ethylene carbonate (EC)
[4]ethylmethyl carbonate (EMC)
[5]fluoroethylene carbonate (FEC)

Figure 2:
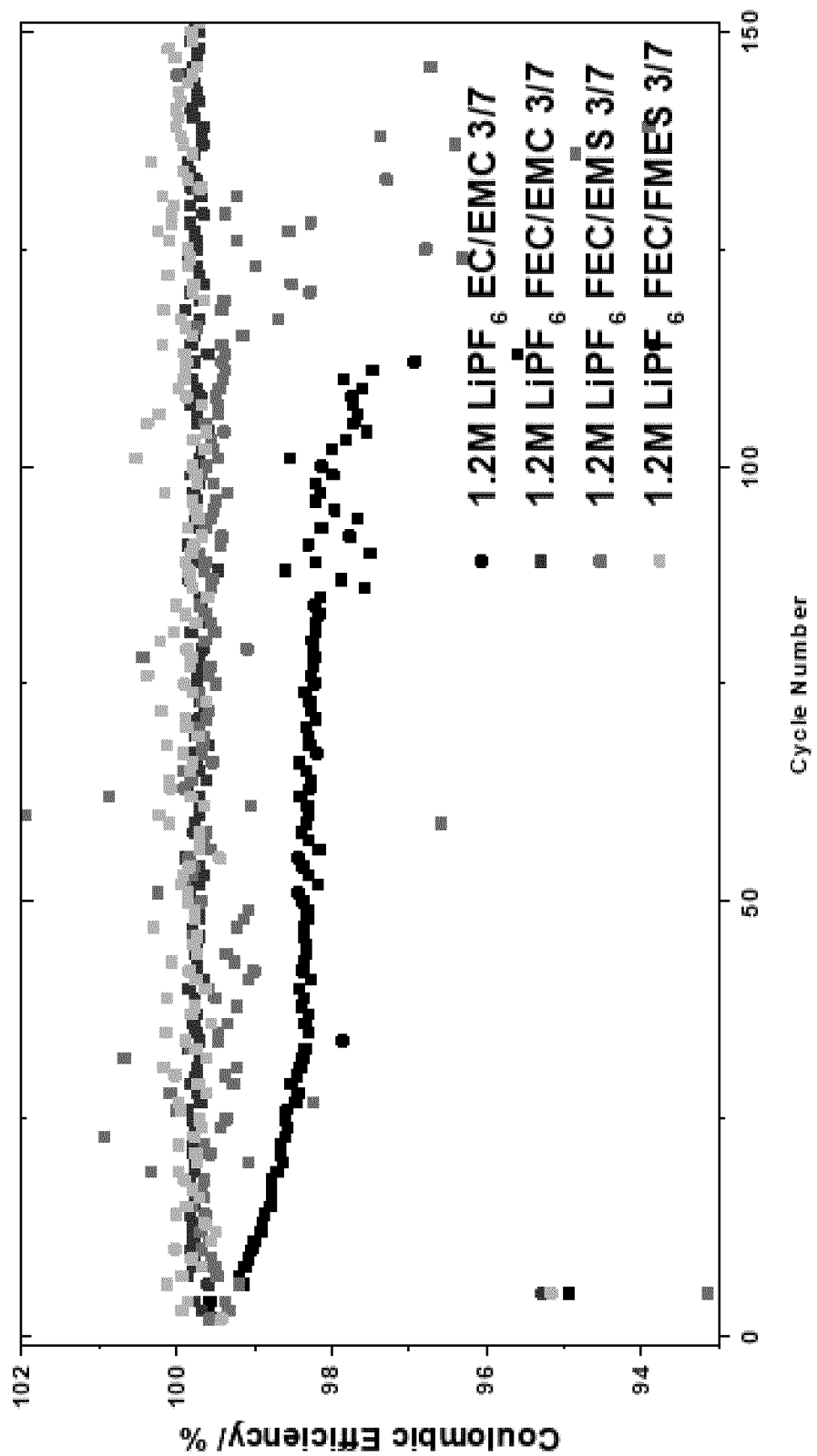
FIG. 2 is a Coulombic efficiency vs. cycle number graph for Li/NCM622 half-cell in the 2032 coin cells using 1.2M LiPF$_6$ in EC/EMC (3:7) electrolyte, 1.2M LiPF$_6$ in FEC/EMC (3:7) electrolyte, 1.2M LiPF$_6$ in FEC/EMS (3:7) electrolyte and 1.2M LiPF6 in FEC/FMES (3:7) electrolyte. The cells were cycled from 3.0 V to 4.4 V at the rate of C/2, according to Example 1.

FIG. 1 shows the discharge capacity of half-cells 1-4. The cells were cycled from 3.0 V to 4.4 V at the rate of C/2. Half-cell 1 showed server capacity degradation after 110 cycles. It is believed that the poor performance is the result of the EC not forming a sufficient SEI layer on the Li metal, thereby resulting in dendrite formation and impedance increase. Half-cells 2-3, all with FEC as the SEI forming material, exhibited greater capacity retention than Half-cell 1, due to the FEC forming a robust SEI on the lithium metal to prevent dendrite formation. Half-cell 4 exhibited the greatest capacity retention, demonstrating that the fluorinated sulfone has high oxidation stability and better lithium metal compatibility than Half-cell 3. FIG. 2 illustrates the Coulombic efficiency of Half-cells 1-4. Half-cell 1 exhibited the lowest Coulombic efficiency of about 98%. This is believed to be due to unfavorable SEI formation on the Li metal. In contrast, Half-cells 2-4, all with FEC as SEI former, exhibited a Coulombic efficiency of about 99.5%.

Example 2

Li/Li symmetric cells were prepared according to the following:

| Cell | Electrolyte | |
|---|---|---|
| | Salt | Solvent |
| 5 | 1.2M $LiPF_6$ | EC/EMC (3/7) |
| 6 | 1.2M $LiPF_6$ | FEC/EMC (3/7) |
| 7 | 1.2M $LiPF_6$ | FEC/FMES (3/7) |

Figure 3:
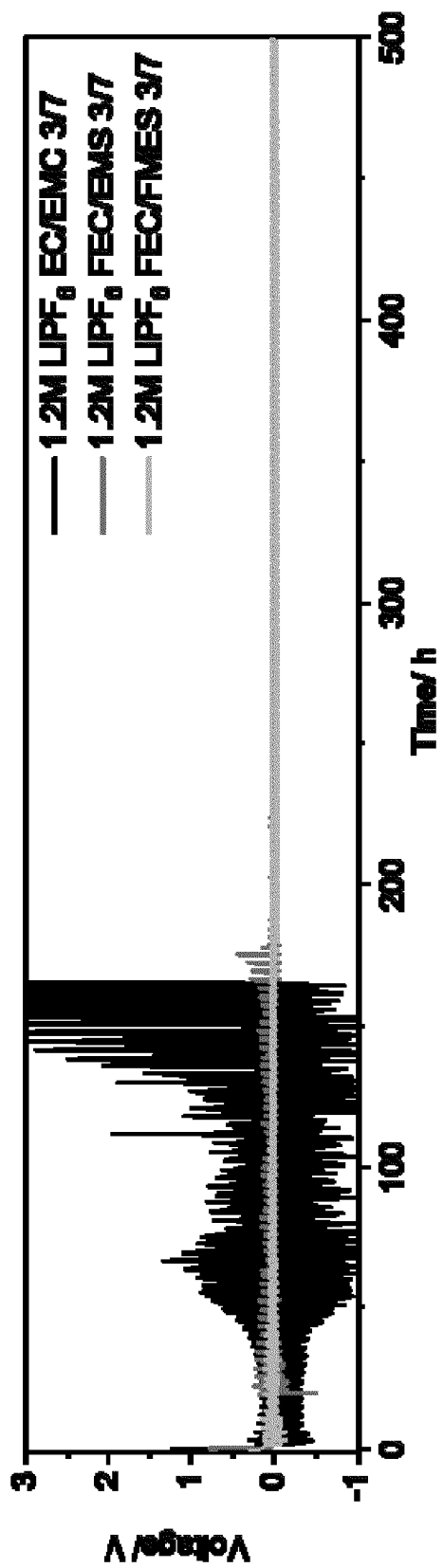
FIG. 3 illustrates the Lithium/Lithium symmetric cell data in three different electrolytes: 1.2M LiPF$_6$ in EC/EMC (3:7) electrolyte, 1.2M LiPF$_6$ in FEC/EMC (3:7) electrolyte, 1.2M LiPF$_6$ in FEC/FMES (3:7) electrolyte, according to Example 2.

The Li/Li symmetric cells (Li is present in both the anode and cathode) were used to investigate the plating-striping stability of the Li metal anode in different electrolytes, at a 2 mA/cm$^2$ current density during cycling of the cell for over 500 hours. The results are shown by FIG. 3. Upon cycling of Cell 5, it showed a high voltage polarization and that was not stabilized in cycling beyond 150 hours. Cell 5 also indicated that the EC-based electrolyte does not form a good SEI on the Li metal electrode to enable the Li$^+$ plating and striping. Cell 6 exhibited a significantly lower polarization compared to that of Cell 5. Cell 7 exhibited the best performance. Although Cell 7 exhibited a medium polarization in the initial 10 cycles, the voltage stabilized after that due to a robust SEI formed by the FEC and FMES on the Li metal, which can initiate the Li$^+$ plating striping. The symmetric cells (6 and 7) can cycle over 500 hours with very low polarization.

Example 3

Full cells were prepared with a $LiNi_{0.5}Mn_{0.3}Co_{0.2}O_2$ cathode and a graphite anode according to the following table:

| Full cell | Electrolyte | |
|---|---|---|
| | Salt | Solvent |
| 8 | 1.2M $LiPF_6$ | EC/EMC (3/7) |
| 9 | 1.0M $LiPF_6$ | $DFEC^6$/EMC (3/7) |
| 10 | 1.0M $LiPF_6$ | DFEC/FMES (1/20) |
| 11 | 1.0M $LiPF_6$ | DFEC/FMES (3/7) |

[6]difluoroethylene carbonate (DFEC)

In the cells, the binder was polyvinylidenedifluoride (PVDF) and the current collectors for the anode and cathode were copper and aluminum, respectively.

Figure 4:
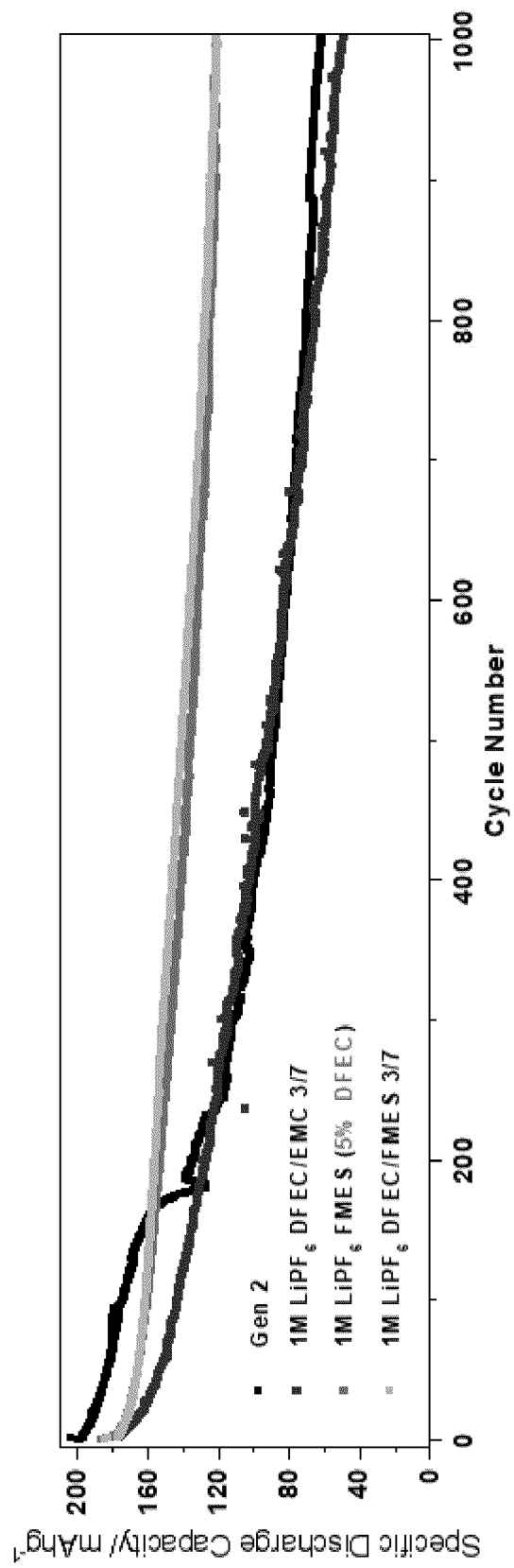
FIG. 4 is a discharge capacity vs. cycle number graph for Graphite/NCM523 full-cell in the 2032 coin cells using Gen 2 electrolyte, 1M LiPF$_6$ in DFEC/EMC (3:7) electrolyte, 1M LiPF$_6$ in FMES with 5% DFEC electrolyte and 1M LiPF$_6$ in DFEC/FMES (3:7) electrolyte. The cells were cycled from 3.0 V to 4.5 V at the rate of C/2, according to Example 3.
Figure 5:
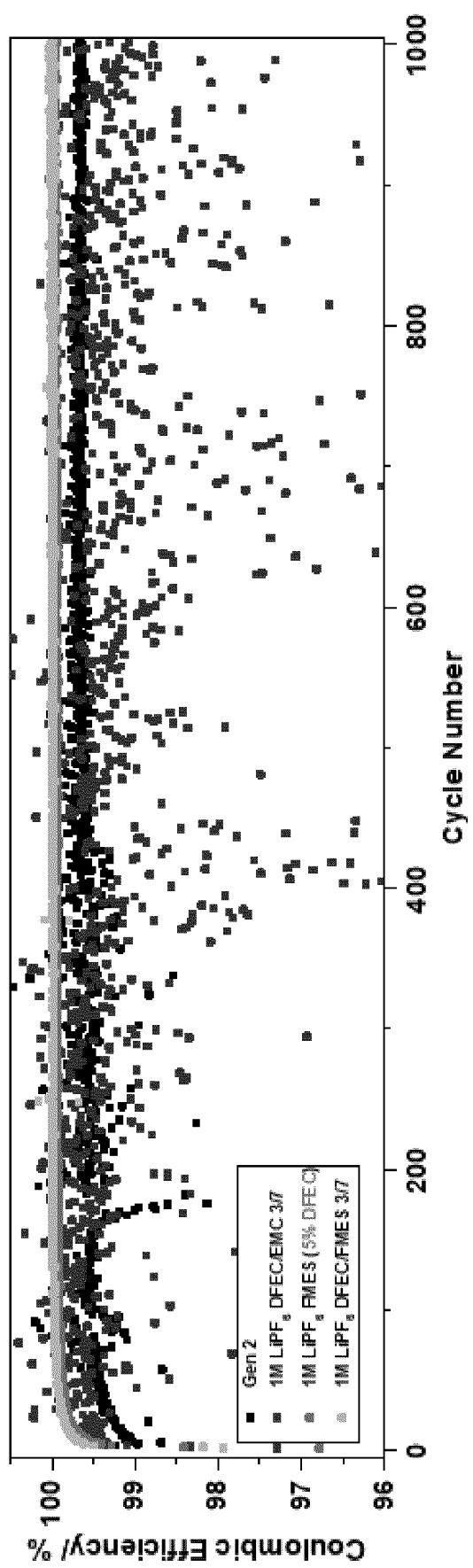
FIG. 5 is a Coulombic efficiency vs. cycle number graph for Graphite/NCM523 full-cell in the 2032 coin cells using Gen 2 electrolyte, 1M LiPF$_6$ in DFEC/EMC (3:7) electrolyte, 1M LiPF$_6$ in FMES with 5% DFEC electrolyte and 1M LiPF$_6$ in DFEC/FMES (3:7) electrolyte. The cells were cycled from 3.0 V to 4.4 V at the rate of C/2, according to Example 3.

FIG. 4 illustrates the discharge capacity of the above Full cells. The cells were cycled from 3.0 V to 4.4 V at the rate of C/2. Full cell 8 exhibited server capacity degradation after 200 cycles. Moreover, the EMC and EC cannot withstand the higher cutoff voltage, thereby leading to cell degradation nand capacity fade. Full cells 10 and 11 exhibited significantly enhanced capacity retention, presumably due to the FMES co-solvent imparting high voltage stability. Full cells 10 and 11 also demonstrated the feasibility of using DFEC as additive instead of co-solvent. In other words, additive amounts (≤5%) of DFEC (SEI enabler) are sufficient to provide stable cycling of fluorinated sulfone-based electrolytes. FIG. 5 illustrates the Coulombic efficiency of Full cells 8-11. Full cells 8 and 9 exhibited low Coulombic efficiencies of about 99.5%, while Full cells 10 and 11 exhibited an average Coulombic efficiency of greater than 99.9%.

Example 4

Full cells were prepared with a $LiNi_{0.5}Mn_{0.3}Co_{0.2}O_2$ cathode and a graphite anode according to the following table:

|  | Electrolyte | |
| --- | --- | --- |
| Full cell | Salt | Solvent |
| 12 | 1.2M $LiPF_6$ | DFEC/FMES (3/7) |
| 13 | 1.2M $LiPF_6$ | DFEC/FMES (3/7) + 1 wt % TFDTD[7] |

[7]4-(trifluoromethyl)-1,3,2-dioxathiolane-2,2-dioxide (TFDTD)

Figure 6:
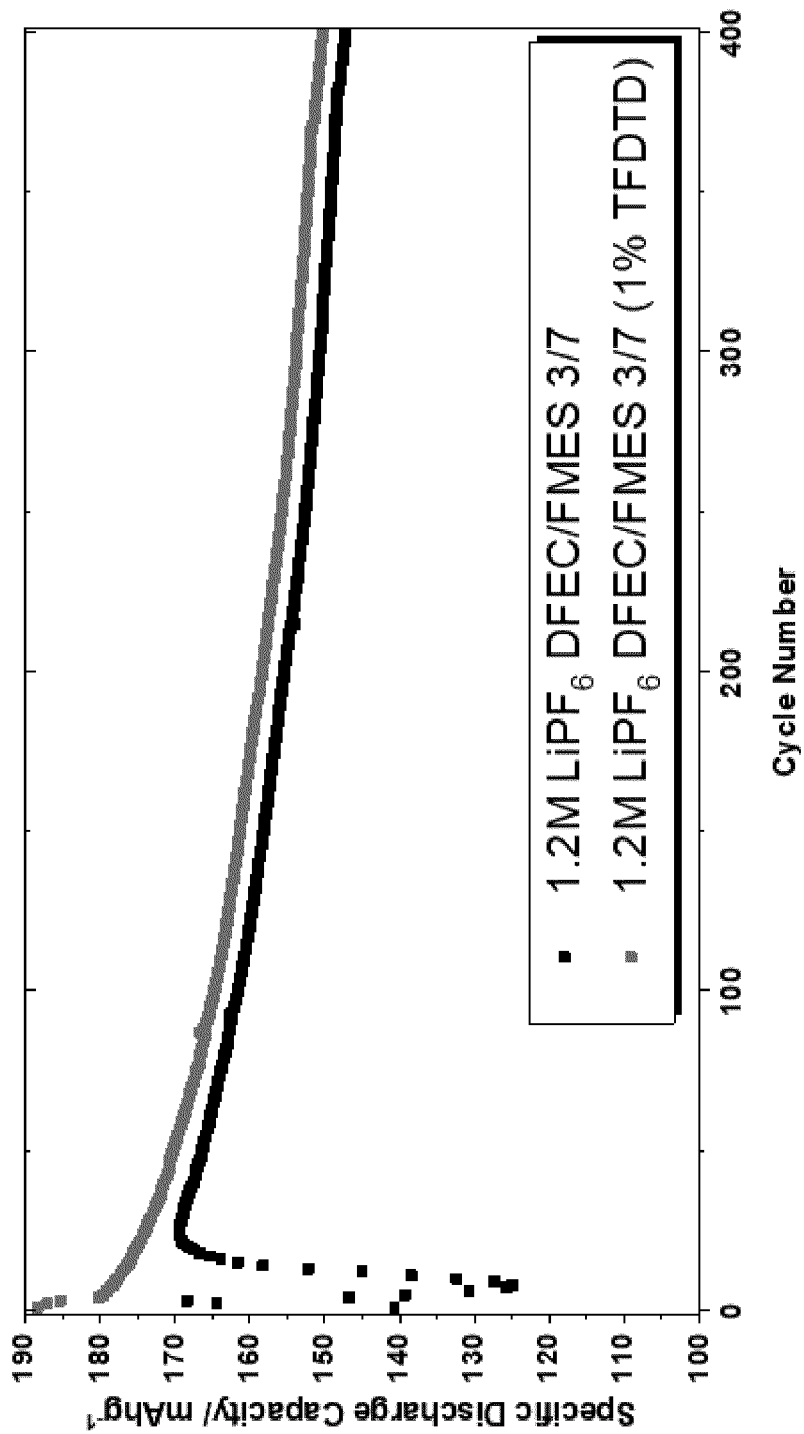
FIG. 6 is a discharge capacity vs. cycle number graph for LiNi$_{0.6}$Mn$_{0.2}$Co$_{0.2}$O$_2$/graphite full-cell in the 2032 coin cells using 1.2M LiPF$_6$ in DFEC/FMES 3/7 electrolyte, 1.2M LiPF$_6$ in DFEC/FMES 3/7 with 1% TFDTD electrolyte. The cells were cycled from 3.0 V to 4.5 V at the rate of C/2, according to Example 4.
Figure 7:
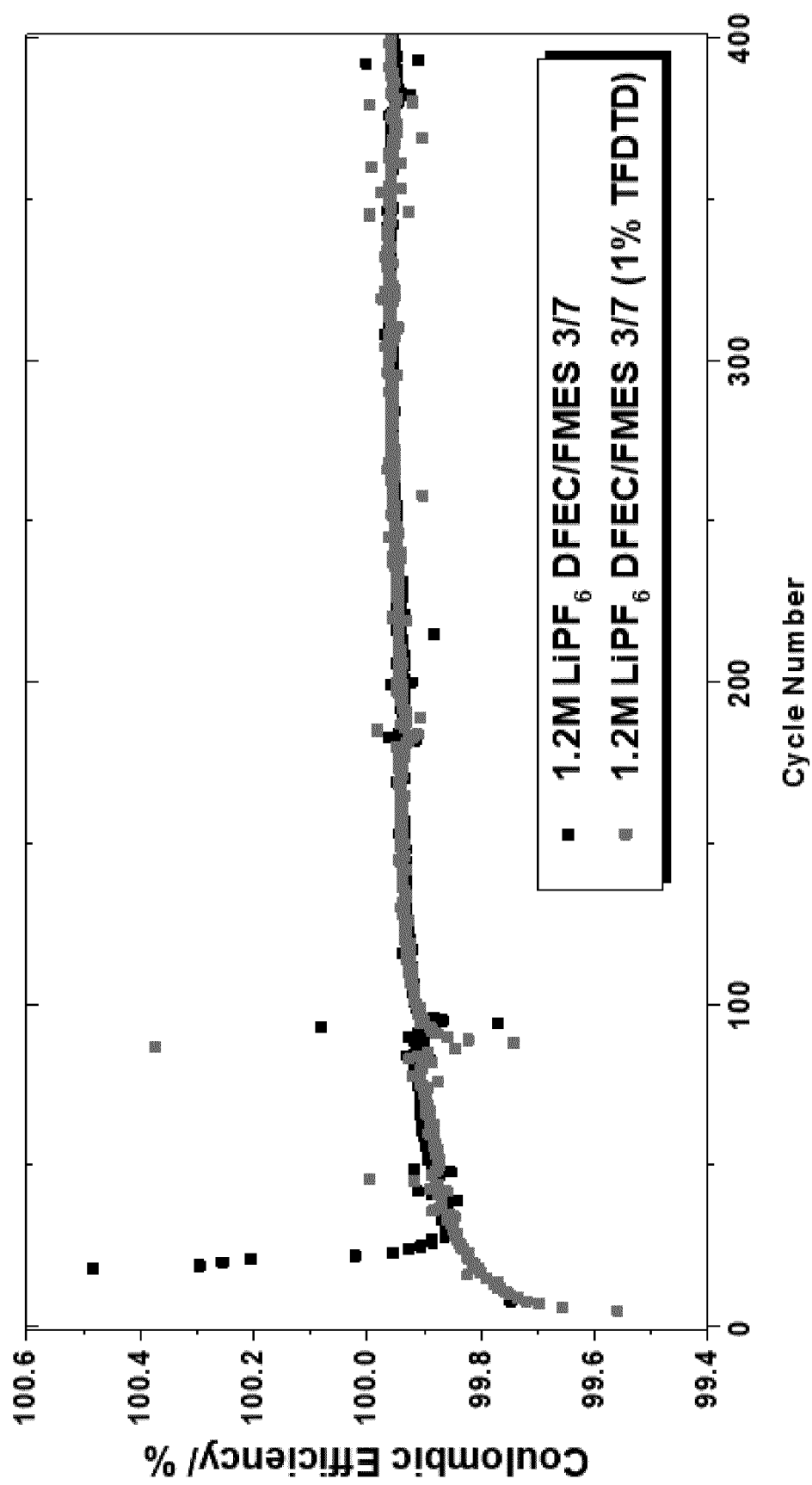
FIG. 7 is a Coulombic efficiency vs. cycle number graph for Graphite/NCM523 full-cell in the 2032 coin cells using 1.2M LiPF$_6$ in DFEC/FMES (3:7) electrolyte, 1M LiPF6 in DFEC/FMES (3:7) with 1% TFDTD electrolyte. The cells were cycled from 3.0 V to 4.5 V at the rate of C/2, according to Example 4.

FIG. 6 illustrates the discharge capacity of Full cells 12 and 13. The cells were cycled from 3.0 V to 4.5 V at the rate of C/2. With the addition of the 1 vol % TFDTD, the capacity is further improved due to the TFDTD forming a robust SEI to further mitigate the electrolyte side reactions on the electrode. FIG. 7 illustrates the Coulombic efficiencies of the above cells. Full cells 12 and 13 exhibited a similar Coulombic efficiency at greater than 99.9%.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical cell comprising:
   a cathode comprising a cathode active material;
   an anode comprising lithium metal;
   a separator; and
   an electrolyte comprising a lithium salt, an organic aprotic solvent and a fluorinated sulfone represented by Formula II:

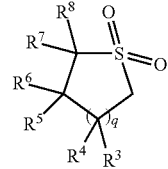

Formula II wherein:
   $R^3$ and $R^4$ are individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —$C(O)R^{10}$, —$C(O)OR^{10}$, or —$OC(O)R^{10}$;
   $R^5$, $R^6$, $R^7$, and $R^8$ are individually H, F, Cl, Br, I, $OR^9$, alkyl, alkenyl, alkynyl, silyl, siloxy, aryl, aralkyl, heterocyclyl, heterocyclylalkyl, cycloalkyl, cycloalkylalkyl, —$C(O)R^{10}$, —$C(O)OR^{10}$, or —$OC(O)R^{10}$;
   $R^9$ is H, alkyl, alkenyl, alkynyl, aryl, aralkyl, or heterocyclyl;

$R^{10}$ is H, alkyl, alkenyl, alkynyl, aryl, aralkyl, or heterocyclyl; and q is 1 or 2;

wherein: at least one of $R^3$, $R^4$, $R^5$, $R^6$, $R^7$, and $R^8$ is F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

2. The electrochemical cell of claim 1, wherein:

$R^3$ and $R^4$ are individually H, F, Cl, Br, I, O$R^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$;

$R^5$, $R^6$, $R^7$, and $R^8$ are individually H, F, Cl, Br, I, O$R^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$;

$R^9$ is H, fluorinated or non-fluorinated alkyl, fluorinated or non-fluorinated alkenyl, fluorinated or non-fluorinated alkynyl, fluorinated or non-fluorinated aryl, fluorinated or non-fluorinated aralkyl, or fluorinated or non-fluorinated heterocyclyl, $R^{10}$ is H, fluorinated or non-fluorinated alkyl, fluorinated or non-fluorinated alkenyl, fluorinated or non-fluorinated alkynyl, fluorinated or non-fluorinated aryl, fluorinated or non-fluorinated aralkyl, or fluorinated or non-fluorinated heterocyclyl.

3. The electrochemical cell of claim 1, wherein:

$R^3$ and $R^4$ are individually H, F, OH, OCH$_3$, OCFH$_2$, OCF$_2$H, OCF$_3$, OCHCH$_2$, OCFCH$_2$, OCHCFH, OCHCF$_2$, OCFCF$_2$, OCH$_2$CHCH, OCFHCHCH, OCH$_2$CFCH, OCH$_2$CHCF, OCH$_2$CFCF, OCF$_2$CFCF, CH$_2$Ph, CF$_2$Ph, CF$_2$(fluorinated phenyl), CH$_2$(fluorinated phenyl), C$_n$H$_x$F$_y$, CH$_2$C$_n$H$_x$F$_y$, CH$_2$OC$_n$H$_x$F$_y$, or CF2OC$_n$H$_x$F$_y$;

$R^5$, $R^6$, $R^7$, and $R^8$ are individually H, F, OH, OCH$_3$, OCFH$_2$, OCF$_2$H, OCF$_3$, OCHCH$_2$, OCFCH$_2$, OCHCFH, OCHCF$_2$, OCFCF$_2$, OCH$_2$CHCH, OCFHCHCH, OCH$_2$CFCH, OCH$_2$CHCF, OCH$_2$CFCF, OCF$_2$CFCF, CH$_2$Ph, CF$_2$Ph, CF$_2$(fluorinated phenyl), CH$_2$(fluorinated phenyl), C$_n$H$_x$F$_y$, CH$_2$C$_n$H$_x$F$_y$, CH$_2$OC$_n$H$_x$F$_y$, or CF$_2$OC$_n$H$_x$F$_y$;

n is 1, 2, 3, 4, 5, 6, 7, 8, 9, 10, 11, or 12;

x is 0, 1, 2, or 3; and y is 0, 1, 2, or 3.

4. The electrochemical cell of claim 1, wherein:

$R^3$ and $R^4$ are individually H, F, OH, OCH$_3$, OCF$_3$, C$_n$H$_x$F$_y$, CH$_2$C$_n$H$_x$F$_y$, CH$_2$OC$_n$H$_x$F$_y$, or CF$_2$OC$_n$H$_x$F$_y$;

$R^5$, $R^6$, $R^7$, and $R^8$ are individually H, F, OH, OCH$_3$, OCF$_3$, C$_n$H$_x$F$_y$, CH$_2$C$_n$H$_x$F$_y$, CH$_2$OC$_n$H$_x$F$_y$, or CF$_2$OC$_n$H$_x$F$_y$;

n is 1, 2, 3, 4, 5, 6, 7, 8, 9, 10, 11, or 12;

x is 0, 1, 2, or 3; and y is 0, 1, 2, or 3.

5. The electrochemical cell of claim 1, wherein at least one of $R^3$ and $R^4$ and at least one of $R^5$, $R^6$, $R^7$, and $R^8$ is F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

6. The electrochemical cell of claim 1, wherein the electrolyte further comprises a compound of Formula I:

Formula I wherein:

$R^1$ and $R^2$ are individually H, F, Cl, Br, I, O$R^9$, alkyl, alkenyl, alkynyl, silyl, siloxy, aryl, aralkyl, heterocyclyl, heterocyclylalkyl, cycloalkyl, cycloalkylalkyl, —C(O)$R^{10}$, —C(O)O$R^{10}$, or —OC(O)$R^{10}$; and at least one of $R^1$ and $R^2$ is F, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$.

7. The electrochemical cell of claim 6, wherein:

$R^1$ and $R^2$ are individually H, F, Cl, Br, I, O$R^9$, fluorinated alkyl, fluorinated alkenyl, fluorinated alkynyl, fluorinated silyl, fluorinated siloxy, fluorinated —C(O)$R^{10}$, fluorinated —C(O)O$R^{10}$, or fluorinated —OC(O)$R^{10}$;

$R^9$ is H, fluorinated or non-fluorinated alkyl, fluorinated or non-fluorinated alkenyl, fluorinated or non-fluorinated alkynyl, fluorinated or non-fluorinated aryl, fluorinated or non-fluorinated aralkyl, or fluorinated or non-fluorinated heterocyclyl;

$R^{10}$ is H, fluorinated or non-fluorinated alkyl, fluorinated or non-fluorinated alkenyl, fluorinated or non-fluorinated alkynyl, fluorinated or non-fluorinated aryl, fluorinated or non-fluorinated aralkyl, or fluorinated or non-fluorinated heterocyclyl.

8. The electrochemical cell of claim 6, wherein:

$R^1$ and $R^2$ are individually H, F, OH, OCH$_3$, OCFH$_2$, OCF$_2$H, OCF$_3$, OCHCH$_2$, OCFCH$_2$, OCHCFH, OCHCF$_2$, OCFCF$_2$, OCH$_2$CHCH, OCFHCHCH, OCH$_2$CFCH, OCH$_2$CHCF, OCH$_2$CFCF, OCF$_2$CFCF, CH$_2$Ph, CF$_2$Ph, CF$_2$(fluorinated phenyl), CH$_2$(fluorinated phenyl), C$_n$H$_x$F$_y$, CH$_2$C$_n$H$_x$F$_y$, CH$_2$OC$_n$H$_x$F$_y$, or CF$_2$OC$_n$H$_x$F$_y$;

n is 1, 2, 3, 4, 5, 6, 7, 8, 9, 10, 11, or 12;

x is 0, 1, 2, or 3; and y is 0, 1, 2, or 3.

9. The electrochemical cell of claim 6, wherein:

$R^1$ and $R^2$ are individually H, F, OH, OCH$_3$, OCF$_3$, C$_n$H$_x$F$_y$, CH$_2$C$_n$H$_x$F$_y$, CH$_2$OC$_n$H$_x$F$_y$, or CF$_2$OC$_n$H$_x$F$_y$;

n is 1, 2, 3, 4, 5, 6, 7, 8, 9, 10, 11, or 12;

x is 0, 1, 2, or 3; and y is 0, 1, 2, or 3.

10. The electrochemical cell of claim 1, wherein the lithium salt comprises lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2"-tris(trifluoromethyl)benzotris(imidazolate); LiN(CN)2; Li(CF3CO2); Li(C2F5CO2); LiCF$_3$SO$_3$; LiCH$_3$SO$_3$; LiN(SO$_2$CF$_3$)$_2$; LiN(SO$_2$F)$_2$; LiC(CF$_3$SO$_2$)$_3$; LiN(SO$_2$C$_2$F$_5$)$_2$; LiClO$_4$; LiBF$_4$; LiAsF$_6$; LiPF$_6$; LiBF$_2$(C$_2$O$_4$), LiB(C$_2$O$_4$)$_2$, LiPF$_2$(C$_2$O$_4$)$_2$, LiPF$_4$(C$_2$O$_4$), LiAsF$_6$, CsF, CsPF$_6$, LiN(SO$_2$CF$_3$)$_2$, LiN(SO$_2$F)$_2$, Li$_2$(B$_{12}$X$_{12-p}$ H$_p$); Li$_2$(B$_{10}$X$_{10-p'}$H$_{p'}$); or a mixture of any two or more thereof, wherein X is independently at each occurrence a halogen, p is 0, 1, 2, 3, 4, 5, 6, 7, 8, 9, 10, 11, or 12, and p' is 0, 1, 2, 3, 4, 5, 6, 7, 8, 9, or 10.

11. The electrochemical cell of claim 1, wherein the organic aprotic solvent is a linear carbonate, cyclic carbonate, ester, cyclic ester, or sulfone.

12. The electrochemical cell of claim 1, wherein the organic aprotic solvent is a compound represented by Formula III, IV, V, VI, VII, VIII, IX, X, XI, XII, XIV, or a mixture of any two or more thereof:

| Formula | |
|---|---|
| $R^{11}OC(O)OR^{12}$ | III |
| (1,3-dioxolan-2-one with $R^{11}$, $R^{12}$ substituents) | IV |
| $R^{11}OC(O)R^{12}$ | V |
| (γ-butyrolactone with $R^{11}$, $R^{12}$, $R^{13}$ substituents) | VI |
| (δ-valerolactone with $R^{11}$, $R^{12}$, $R^{13}$, $R^{14}$ substituents) | VII |
| $R^{11}\!-\!S(O)_2\!-\!R^{12}$ | VIII |
| $R^{11}\!-\!CN$ | IX |
| $NC(CH_2)_mCN$ | X |
| $R^{11}\!-\!O\!-\!R^{12}$ | XI |

| Formula | |
|---|---|
| $R^{11}\!-\!(OCH_2CH_2)_mOR^{12}$ | XII |
| $R^{11}C(O)NR^{12}R^{13}$ | XIII |
| $R^{11}OC(O)NR^{12}R^{13}$ | XIV |

$R^{11}$, $R^{12}$, $R^{13}$, and $R^{14}$ are individually H, F, Cl, Br, I, CN, oxo, $OR^9$, alkyl, alkenyl, alkynyl, silyl, siloxy, —C(O)$R^{10}$, —C(O)O$R^{10}$, or —OC(O)$R^{10}$; and m is 1, 2, 3, 4, 5, or 6.

13. The electrochemical cell of claim 12, wherein at least one of $R^{11}$, $R^{12}$, $R^{13}$, and $R^{14}$ is F or a fluorinated group.

14. The electrochemical cell of claim 13, wherein at least one of $R^{11}$, $R^{12}$, $R^{13}$, and $R^{14}$ is F, $C_nH_xF_y$, $CH_2C_nH_xF_y$, $CH_2OCnHx\text{-}yFy$, or $CF_2OC_nH_xF_y$; n is 1, 2, 3, 4, 5, 6, 7, 8, 9, 10, 11, or 12; x is 0, 1, 2, or 3; and y is 0, 1, 2, or 3.

15. The electrochemical cell of claim 1, wherein the organic aprotic solvent in the electrolyte comprises a pyrrolidinium-based ionic liquid, a piperidinium-based ionic liquid, a imidazolium-based ionic liquid, a ammonium-based ionic liquid, phosphonium-based ionic liquid, or a cyclic phosphonium-based ionic liquid.

16. The electrochemical cell of claim 1 that is a lithium secondary battery, and the secondary battery is a lithium battery, a lithium-ion battery, a lithium-sulfur battery, or a lithium-air battery.

17. The electrochemical cell of claim 1, wherein the polar aprotic solvent comprises one or more of ethylmethylsulfone (EMS), ethyl(trifluoromethyl)sulfone (FMES), ethylene carbonate (EC), ethylmethyl carbonate (EMC), fluoroethylene carbonate (FEC), difluoroethylene carbonate (DFEC).

\* \* \* \* \*